United States Patent [19]

Pettigrew

[11] 4,376,958

[45] Mar. 15, 1983

[54] MODIFIED FREQUENCY MODULATION

[75] Inventor: Archibald M. Pettigrew, Glenrothes, Scotland

[73] Assignee: Elcomatic Limited, Glasgow, Scotland

[21] Appl. No.: 166,777

[22] Filed: Jul. 8, 1980

[30] Foreign Application Priority Data

Jul. 10, 1979 [GB] United Kingdom ................ 7924057
Dec. 28, 1979 [GB] United Kingdom ................ 7944454
Mar. 11, 1980 [GB] United Kingdom ................ 8008108

[51] Int. Cl.³ .............................................. G11B 5/09
[52] U.S. Cl. ........................................ 360/41; 360/43; 360/51
[58] Field of Search ....................... 360/41, 43, 51, 44, 360/67

[56] References Cited

U.S. PATENT DOCUMENTS

| 3,404,391 | 10/1968 | Chur | 360/43 |
| 3,794,987 | 2/1974 | Walenrz | 360/43 |
| 3,846,829 | 11/1974 | Lin | 360/46 |
| 3,968,328 | 7/1976 | Tsochoya et al. | 360/41 |

Primary Examiner—Vincent P. Canney
Attorney, Agent, or Firm—Auslander, Thomas & Morrison

[57] ABSTRACT

There is described methods and circuitry for decoding modified frequency modulated (MFM) information signals as obtained from rotating magnetic storage devices, such as floppy disks and hard disks used in computers. The novel technique involves twice squaring an information carrying data signal mathematically and without saturation, deriving a clock signal from the twice squared data signal using a phase lock loop and thereafter recovering an information signal from said data signal and clock signal.

18 Claims, 5 Drawing Figures

MODIFIED FREQUENCY MODULATION

This invention relates to improvements in modified frequency modulation (MFM) used in digital magnetic storage.

More particularly the invention relates to a method and circuitry for decoding of signals from rotating magnetic storage devices, e.g. floppy disk drives or hard disk drives which use the MFM encoding technique.

The advantage of using MFM are now well established in the sense that it is a self clocking coding technique of high efficiency.

MFM is an encoding technique used in digital recording and is suitable for application to magnetic recording since there is no requirement for the magnetic recording channel to carry a D.C. bandwidth. It may be described very briefly as synchronous phase encoding where a 'zero' is represented by a carrier at angle zero degrees and a 'one' represented by the same carrier at angle ninety degrees. The actual process of encoding consists of multiplying the baseband digital data of maximum frequency, say 2F, into the clock signal of frequency 4F. The result of this angle or digital multiplication is divided by two in a flip flop and the result is defined as MFM. This is illustrated in waveforms 1a–1d of FIG. 1 which shows the various critical stages of encoding and decoding of MFM.

Describing the decoding process very briefly, there is obtained a head signal which is amplified (waveform 1e) and then differentiated (waveform 1f). The output of the differentiator (waveform 1f) is applied to a zero crossing detector (ZCD) followed by a monostable of defined length to give the pulse train illustrated by waveform 1g. The output of the monostable is applied to a phase lock loop (PLL) and a clock signal at 8F is generated (waveform 1h). This 8F clock signal is divided by two (waveform 1i) and, after selection of the correct phase (waveform 1j), is multiplied digitally back into the data stream. The product of this multiplication is in fact the original baseband as illustrated by waveform 1k.

The theoretical treatment of noise appearing in the output (digital errors) has centred up until the present on the type of analogue filter preceding the ZCD and its spectral position relative to the data spectrum. Further analytical treatment has examined the jitter in the timing of the pulse at the ZCD output. This jitter is said to consist of a number of components adding to a total value which in no case should exceed half the time for which the "window" detector in waveform 1j is high or open otherwise an error digit will be registered.

In existing analyses the clock signal is assumed to be unchanging, i.e. of fixed frequency, as though derived from a crystal. Further, the track range of the PLL is deemed to be sufficient if it is greater than any anticipated steady state change in the data frequency being read from the magnetic media. The zero crossing detector is viewed as a simple technique for eliminating amplitude variations in the analogue waveform and thus rendering the signal suitable for digital processing. The zero crossing detector in hitherto known circuits is a squaring circuit (linear squaring and saturation) followed by a phase detector or modulator (or demodulator). The square function is necessary to double the frequency of the data to complement the halving in the recording mode. This is equivalent mathematically to taking the square root of the signal, transmitting the compressed bandwidth and squaring the signal on reception. The saturation simply multiplies all noise into the signal as a phase angle perturbation whose sidebands are then so close to the carrier that no further analogue filtering can take place.

A further disadvantage of this code is the requirement for a phase locked loop operating in harmonic locking mode to regenerate the clock waveform.

Due to the encoding law, a clock pulse does not necessarily appear in each bit cell as does occur in say frequency modulation (FM). The worst case occurs when decoding a series of alternate ones and zeros. In this case a clock pulse only exists on every alternate bit cell.

The phase locked loop is used to store the phase of the previous clock pulse with negligible drift. Since the purpose of the PLL is to hold the phase of the clock stationary, little or no consideration is given to the phase bandwidth of the PLL other than the basic requirement that the PLL should be able to pull into lock within a specific time. The amount of locking signal (preamble) represents a significant overhead in the formatting of disk stores and can be as high as thirty percent of the total storage capability of a unit.

Further, the process of decoding MFM involves two distinct stages. The first is the recovery of the clock signal, the second is the recovery of the time data by and large by the multiplication of the original encoded signals by the clock signal in a phase comparator normally called the data window separator.

An object of this invention is to provide a method and circuitry for decoding of MFM used in digital magnetic storage which obviate or mitigate the above disadvantages and attempt to give substantially improved accuracy of data integrity over present decoding systems and wherein the occurence of digital errors in the output is reduced.

In the following description and claims the expressions "mathematically squaring", "squared" and "squaring means" are to be understood as meaning purely mutiplying the signal by itself without saturation of the circuit components and "clipping" of the resultant multiplied signal, i.e. an input signal X is transformed to the signal $X^2$. This is in contrast to, for example, the generation of a square wave from a sine wave, in which saturation does take place.

According to the present invention there is provided a method of decoding MFM information comprising the steps of deriving an information-carrying data signal from a recording medium, mathematically squaring without saturation said data signal to provide a squared data signal, mathematically squaring without saturation said squared data signal, passing said twice squared data signal to a phase lock loop to derive a coherent clock signal, halving the frequency of said coherent clock signal, multiplying the half frequency clock signal with said data signal, and recovering an information signal from said multiplied signal.

Further according to the present invention there is provided a circuit for decoding MFM information, said circuit including means for deriving an information-carrying data signal from a recording medium, first squaring means for receiving said data signal and mathematically squaring without saturation said data signal to provide a squared data signal, second squaring means for receiving and mathematically squaring without saturation said squared data signal, a phase lock loop for deriving a coherent clock signal from said twice squared data signal, means for halving the frequency of said coherent clock signal, means for multiplying the half frequency clock signal with said data signal, and means for recovering an information signal from said multiplied signal.

Still further according to the present invention there is provided a method of decoding MFM information comprising the steps of deriving an information-carrying data signal from a recording medium, generating a data pulse train from said data signal, passing said pulse train through a bandpass filter, passing said filtered pulse train to a phase lock loop to derive a coherent clock signal, halving the frequency of said coherent clock signal, multiplying the half frequency clock signal with said data signal, and recovering an information signal from said multiplied signal.

Still further according to the present invention there is provided a circuit for decoding MFM information, said circuit including means for deriving an information-carrying data signal from a recording medium, a monostable circuit for receiving said data signal and generating a data pulse train from said data signal, a bandpass filter for filtering said data pulse train, a phase lock loop for deriving a coherent clock signal from said filtered data pulse train, means for halving the frequency of said coherent clock signal, a multiplier for multiplying the half frequency clock signal with the data signal, and means for recovering an information signal from said multiplied signal.

Embodiments of the present invention will now be described, by way of example, with reference to the accompanying drawings, in which.

Figure 1:
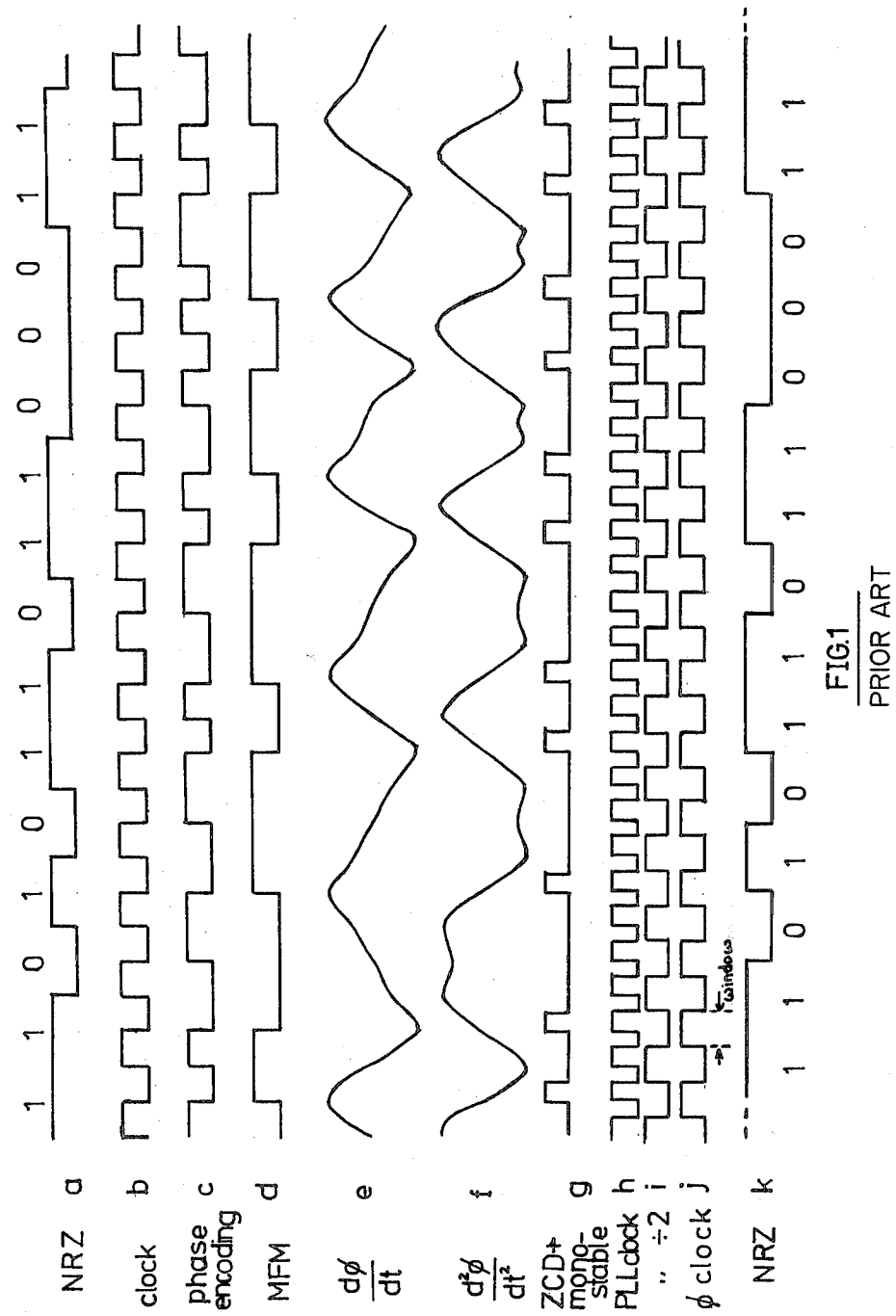
FIG. 1 illustrates typical waveforms employed hitherto in encoding and decoding of MFM.
Figure 2:
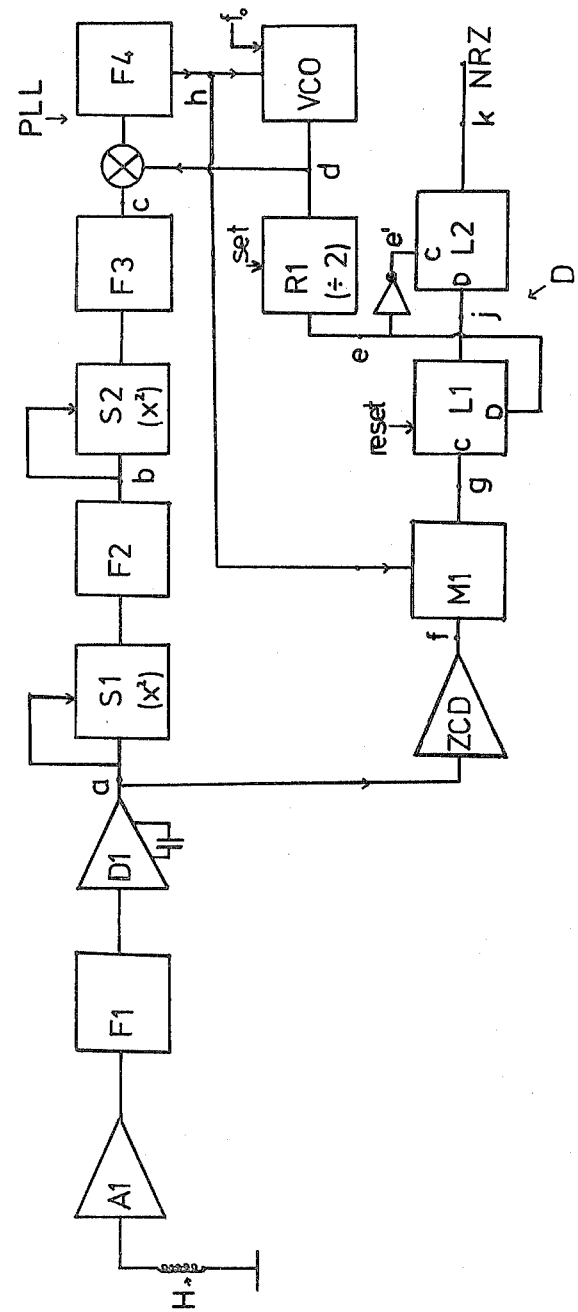
FIG. 2 is a circuit diagram of one embodiment of a circuit made in accordance with the present invention.
Figure 3:
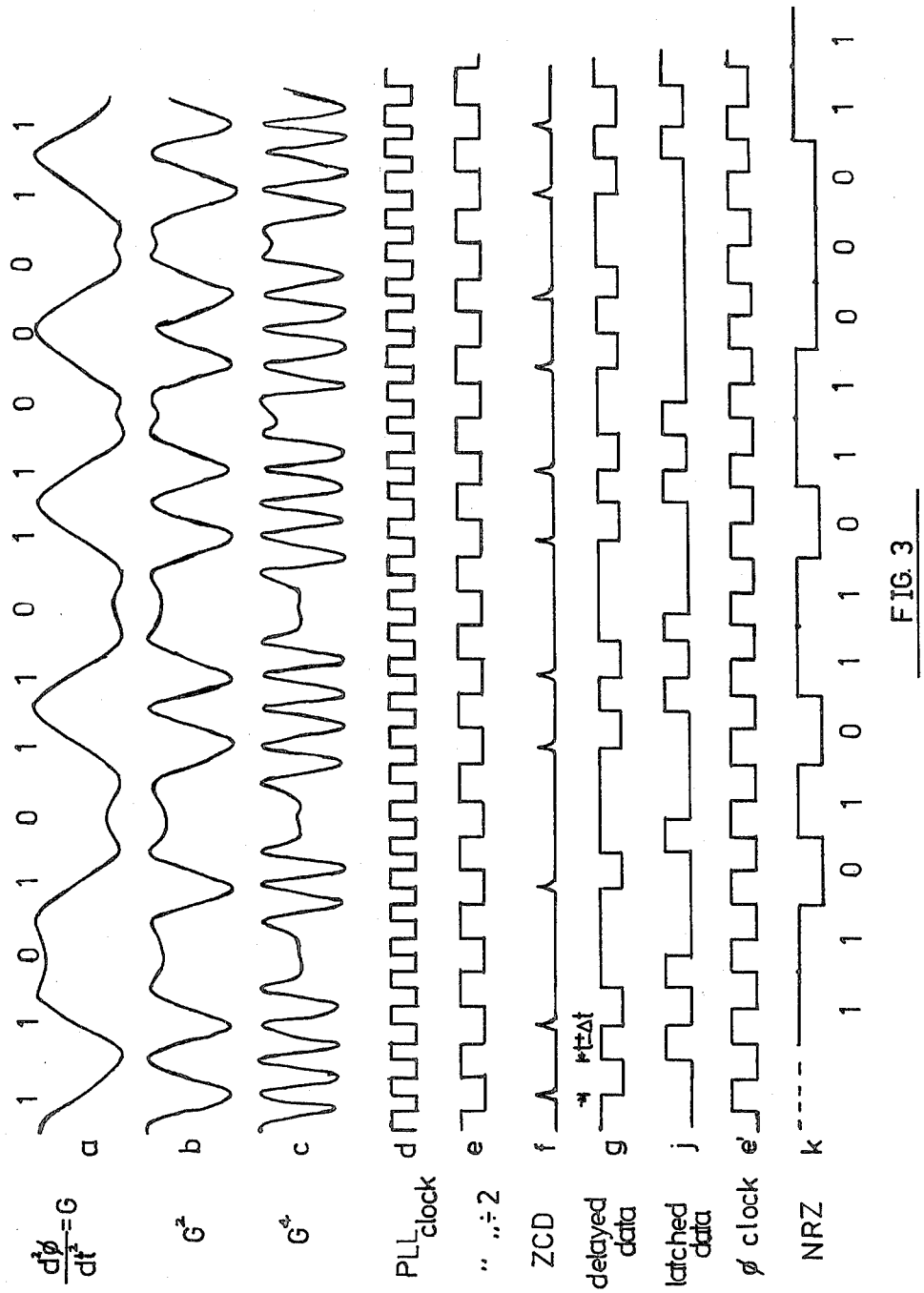
FIG. 3 illustrates the waveforms of the circuit of FIG. 2.

Referring to FIG. 2, an information-carrying head signal is derived from a magnetic pick-up head H, amplified in amplifier A1, filtered in filter F1 to remove DC terms and is then passed to a differentiator D1. The signal thereafter branches into two paths, the first of these paths being to recover a coherent clock signal.

The output of the differentiator D1 (waveform 3a) is applied to a pure squaring circuit S1, i.e. a circuit which squares mathematically without saturation. The output of squaring circuit S1 is then filtered in filter F2 to remove the DC term and is shown as the waveform 3b.

The essential characteristics of the clock recovery is that the phase noise in the clock signal should be maintained as closely as possible to the phase noise in the original signal. The output of filter F2 (waveform 3b) is squared again in pure squarer S2 and filtered in filter F3 to remove the DC term. This signal (waveform 3c) is applied to a phase lock loop PLL at a level to the phase detector to just avoid saturation of the phase detector. This generates the maximum track range capability in the PLL since the track range is a function of the input signal amplitude.

The output signal (waveform 3d) of the VCO of the PLL is then divided by two in a square rooter R1 and the appropriate root selected by priming the divide-by-two flip-flop of the square rooter R1. This waveform is shown at 3e and is now ready for application to a data window comparator D.

The PLL may be considered as having simple CR time constant of $t\mu$ secs delaying any phase information presented to it by that amount. However, due to the sampling technique involved, the delay is affected by the frequency in the PLL and thus the delay is in fact $t \pm \Delta t \mu$ secs where $\Delta t$ represents the additional delay as a result of a signal at the upper end of the PLL bandwidth, $-\Delta t$ being the delay due to a signal at the lower end of the PLL bandwidth.

In its second path, the output of the differentiator D1 is applied to a zero-crossing detector ZCD to produce a train of spikes (waveform 3f) which are used to set a variable period monostable M1 which in effect delays the signal before presentation to the data window comparator D for multiplication with the clock signal 3e. The delay applied by the monostable M1 is equal to the delay in the PLL and thus the supply voltage to M1 is not derived from the power rail but is obtained from the voltage appearing at point h in the PLL. This voltage is proportional to the PLL frequency and will thus provide a delay equal to $t \pm \Delta t \mu$ secs depending on the PLL frequency and which is equal to the phase delay within the PLL. The delayed data pulse from the monostable M1 (waveform 3g) is passed to a first inverted D-latch circuit L1 of the data window comparator D where it is multiplied with the clock signal 3e. As L1 is an inverted D-latch circuit the data pulse 3g is fed to the "clock" input of L1 whereas the clock signal 3e is fed to the "data" input, the output of L1 being a latched data signal 3j, thus on every rising edge of waveform 3g the output of L1 (3j) is set to the value appearing at that instant on the data input i.e. if the value of clock waveform 3e is high at that instant, then the output 3j is set high and if the value of clock waveform 3e is low then the output 3j is set low. In the cases where 3j is set high it remains so till a reset pulse is fed to the "reset" input. The reset input can conveniently be derived from the system clock 3d, each rising edge of the waveform 3d resetting the output of L1 to zero. The output of the inverted D-latch circuit L1 is synchronised in a second D-latch circuit L2 using the opposite phase of the system clock 3e' to give fully synchronised NRZ system output (waveform 3k). L2 is a normal D-latch circuit and thus the clock signal 3e' is fed to the "clock" input of L2 and the latched data signal 3j is fed to the "data" input.

By virtue of the varying of the period of the monostable M1 as a function of the PLL frequency, the width of the pulses of waveform 3g decreases on increase of the PLL clock frequency and increases on decrease of the PLL clock frequency. Accordingly, the window, determined by the PLL clock, is always symmetrical with respect to the rising edge of the pulse train (waveform 3g) which is, in fact, applied to the clock input of latch circuit L1.

Figure 4:
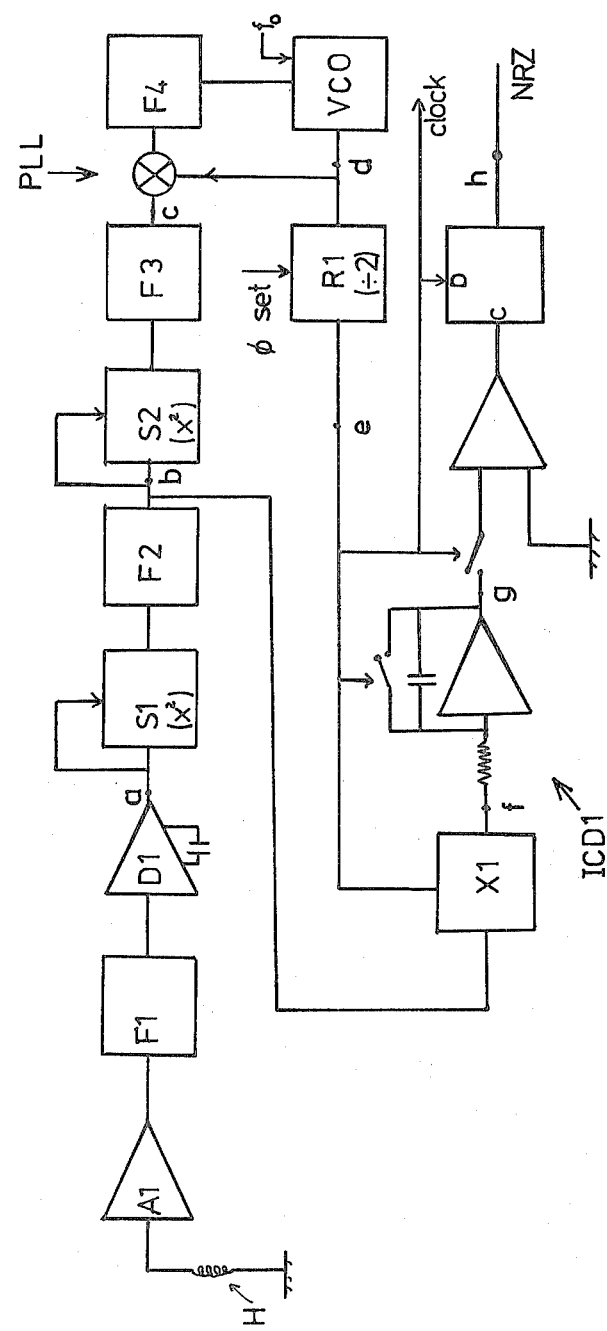
FIG. 4 is a circuit diagram of a second embodiment of a circuit made in accordance with the present invention.
Figure 5:
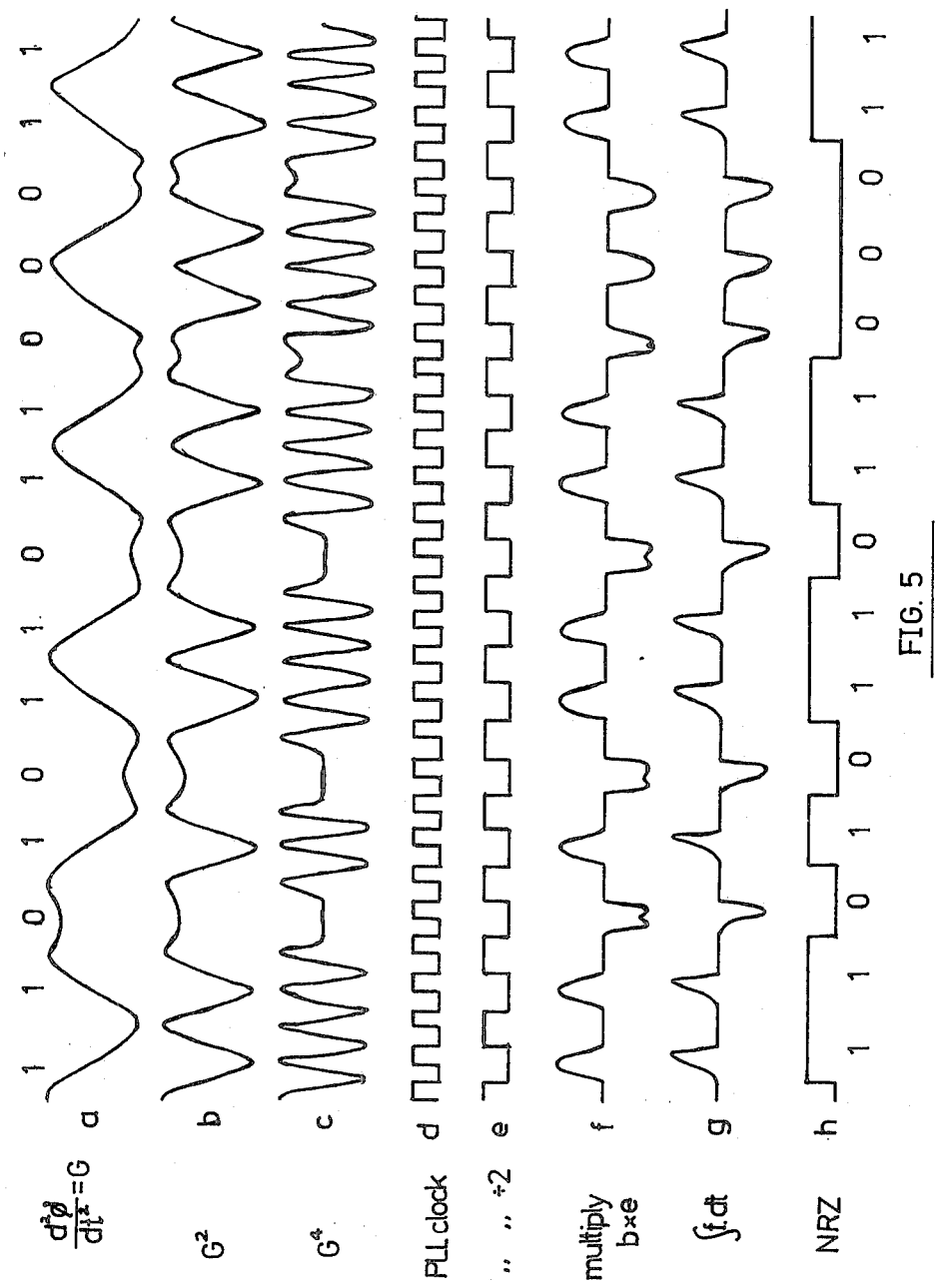
FIG. 5 illustrates the waveforms of the circuit of FIG. 4.

Referring now to FIGS. 4 and 5, the operation of the alternative circuit is similar to that of the circuit of FIG. 2. An information-carrying head signal is derived from a magnetic pick-up head H, amplified in amplifier A1, filtered in filter F1 to remove DC terms and is then passed to a differentiator D1.

The output of the differentiator D1 (waveform 5a) is applied to a pure squaring circuit S1, i.e. a circuit which squares mathematically without saturation. The output of squaring circuit S1 is then filtered in filter F2 to remove the DC term and is shown as the waveform 5b. The signal thereafter branches into two paths, the first of these paths being to recover a coherent clock signal.

The essential characteristics of the clock recovery is that the phase noise in the clock signal should be maintained as closely as possible to the phase noise in the original signal. The output of filter F2 (waveform 5b) is squared again in pure squarer S2 and filtered in filter F3 to remove the DC term. This signal (waveform 5c) is applied to a phase lock loop PPL at a level to the phase detector to just avoid saturation. This generates the maximum track range capability in the PLL since the track range is a function of the input signal amplitude.

The output signal (waveform 5d) of the VCO of the PLL is then divided by two in a square rooter R1 and the appropriate root selected by priming the divide-by-two flip-flop of the square rooter R1. This waveform is shown at 5e.

The output of the square rooter R1 is passed to a multiplier X1 where it is multiplied by the original squared signal waveform 5b obtained from F2. The multiplier X1 is a simple switching multiplier and the correct phase of the clock waveform 5c is to be selected, in this case the low edge of the clock. The product of these two signals is then the signal of waveform 5f.

The carrier plus modulation has now effectively been demodulated. However, it is still necessary to apply a baseband filter and to saturate to return the signal to NRZ logic levels.

This process is achieved by using an Optimum Filter or an Integrator-Correlator-Dumper ICD1.

The energy from each bit is integrated on a capacitor to give the pulse train 5g and the polarity of this voltage is examined at the end of every bit period, i.e. $\pi$ radians of the clock. The polarity is then detected on the comparator and the output stored in the data latch which is then NRZ i.e. the information signal 5h. This is equivalent mathematically to a baseband filter at 2F. This, however, can only be implemented when saturation is avoided at all stages until the final comparator.

To maximise the method of this invention, the PLL circuitry must have as wide a track range as possible. Also it must be driven with as much energy from the signal as possible. Further, the phase noise of the clock, i.e. the error between the phase of the clock and the phase of the data, must be as small as possible since the data and the clock are multiplied in the detector (phase detector) to produce the data. Hence, if the phase bandwidth of the clock is the same as the phase bandwidth of the data then the noise will be common mode and will be rejected (as it would in an amplitude comparator).

What is claimed is:

1. A method of decoding MFM information comprising the steps of deriving an information-carrying data signal from a recording medium, mathematically squaring without saturation said data signal to provide a squared data signal, mathematically squaring without saturation said squared data signal, passing said twice squared data signal to a phase lock loop to derive a coherent clock signal, halving the frequency of said coherent clock signal, multiplying the half frequency clock signal with said data signal, and recovering an information signal from said multiplied signal.

2. A method as claimed in claim 1, wherein said data signal is converted to a data pulse train before being multiplied with said half frequency.

3. A method as claimed in claim 2, wherein the pulses of said data pulse train have a period equal to one half of the period of said clock signal.

4. A method as claimed in any preceding claim and further including the step of delaying said data signal prior to multiplication with said half frequency clock signal.

5. A method as claimed in claim 4, wherein the data signal is delayed by an amount equal to the phase delay of the phase lock loop.

6. A method as claimed in claim 4, wherein the delay is proportional to the phase lock loop frequency.

7. A method as claimed in claim 1, wherein said information signal is recovered using D-type latch circuits.

8. A method as claimed in claim 1, wherein said data signal is mathematically squared without saturation before being multiplied with said half frequency clock signal.

9. A method as claimed in claim 8, wherein said information signal is recovered using an integrator-correlator-dumper circuit.

10. A method as claimed in claim 1, wherein the signal is filtered after each squaring step to remove any DC term.

11. A circuit for decoding MFM information, said circuit including means for deriving an information-carrying data signal from a recording medium, first squaring means for receiving said data signal and mathematically squaring without saturation said data signal to provide a squared data signal, second squaring means for receiving and mathematically squaring without saturation said squared data signal, a phase lock loop for deriving a coherent clock signal from said twice squared data signal, means for halving the frequency of said coherent clock signal, means for multiplying the half frequency clock signal with said data signal, and means for recovering an information signal from said multiplied signal.

12. A circuit as claimed in claim 11, including means for generating a data pulse train from said data signal, said data pulse train being multiplied with said half frequency clock signal.

13. A circuit as claimed in claim 12, wherein said means for generating said data pulse train includes a zero-crossing detector and a monostable circuit.

14. A circuit as claimed in claim 13, wherein the monostable circuit has a variable period which is proportional to the frequency of the phase lock loop.

15. A circuit as claimed in claim 11, wherein said means for recovering said information signal includes D-latch circuits.

16. A circuit as claimed in claim 11, wherein said data signal is mathematically squared without saturation before being multiplied with said half frequency clock signal.

17. A circuit as claimed in claim 16, wherein said means for recovering an information signal includes an integrator-correlator-dumper circuit.

18. A circuit for decoding MFM information, said circuit including means for deriving an information-carrying data signal from a recording medium, a monostable circuit for receiving said data signal and generating a data pulse train from said data signal, a bandpass filter for filtering said data pulse train, a phase lock loop for deriving a coherent clock signal from said filtered data pulse train, means for halving the frequency of said coherent clock signal, a multiplier for multiplying the half frequency clock signal with the data signal, and means for recovering an information signal from said multiplied signal.

* * * * *